(12) United States Patent
Ilzhoefer et al.

(10) Patent No.: US 8,465,084 B2
(45) Date of Patent: Jun. 18, 2013

(54) BODYSHELL STRUCTURE FOR A MOTOR VEHICLE AND METHOD FOR THE PRODUCTION THEREOF

(75) Inventors: Karl-Heinz Ilzhoefer, Kirchheim (DE); Asmir Salkic, Ulm (DE)

(73) Assignee: Daimler AG, Stuttgart (DE)

( * ) Notice: Subject to any disclaimer, the term of this patent is extended or adjusted under 35 U.S.C. 154(b) by 352 days.

(21) Appl. No.: 12/994,889

(22) PCT Filed: Mar. 13, 2009

(86) PCT No.: PCT/EP2009/001836
§ 371 (c)(1),
(2), (4) Date: Nov. 29, 2010

(87) PCT Pub. No.: WO2009/149778
PCT Pub. Date: Dec. 17, 2009

(65) Prior Publication Data
US 2011/0080020 A1    Apr. 7, 2011

(30) Foreign Application Priority Data

Jun. 9, 2008  (DE) .......................... 10 2008 027 429

(51) Int. Cl.
*B62D 29/04* (2006.01)
(52) U.S. Cl.
USPC ......... 296/181.1; 105/396; 264/316; 264/336
(58) Field of Classification Search
USPC .. 296/193.06, 181.2, 181.1, 901.01; 105/396, 105/397; 264/257, 258, 263, 313, 316, 334, 264/335, 336; 29/509

IPC ........................................................ B62D 29/04
See application file for complete search history.

(56) References Cited

U.S. PATENT DOCUMENTS

| 3,483,285 | A | * | 12/1969 | Foley ............................ 264/146 |
| 3,997,645 | A | * | 12/1976 | Dempster ..................... 264/163 |
| 4,682,809 | A | * | 7/1987 | Huss .......................... 296/181.2 |
| 4,808,364 | A | * | 2/1989 | Blunt et al. ................... 264/310 |
| 5,669,999 | A | * | 9/1997 | Anderegg et al. ............ 156/173 |
| 6,647,897 | B1 | * | 11/2003 | Klamka et al. ............... 105/397 |
| 2004/0070233 | A1 |  | 4/2004 | Steinhauser et al. |
| 2005/0281980 | A1 | * | 12/2005 | Cruz et al. .................... 428/131 |
| 2012/0080821 | A1 | * | 4/2012 | Zetouna et al. .............. 264/316 |

FOREIGN PATENT DOCUMENTS

| EP | 0670257 | A | 9/1995 |
| EP | 1375310 | A | 1/2004 |
| FR | 2732301 | A | 10/1996 |
| JP | 03-010973 | U | 2/1991 |
| JP | 2001293746 | A | 10/2001 |

* cited by examiner

*Primary Examiner* — Glenn Dayoan
*Assistant Examiner* — Pinel Romain
(74) *Attorney, Agent, or Firm* — Patent Central LLC; Stephan A. Pendorf

(57) ABSTRACT

The invention relates to a method for the production of a bodyshell structure for a motor vehicle, wherein a sheet-like textile support element impregnated with a curable matrix material is provided and, following the positioning of suitable reinforcing and molding elements, molded around at least one mold core, whereupon the matrix material is cured. After the removal of the at least one mold core, a single-piece bodyshell structure joined by adhesive force remains. The invention further relates to a bodyshell structure produced by means of this method.

27 Claims, 1 Drawing Sheet

BODYSHELL STRUCTURE FOR A MOTOR VEHICLE AND METHOD FOR THE PRODUCTION THEREOF

BACKGROUND OF THE INVENTION

1. Field of the Invention

The invention relates to a method for the production of a bodyshell structure for a motor vehicle and to a bodyshell structure of this type.

2. Description of the Related Art

There is an increasing tendency to use fibre-reinforced plastic components in the production of light-weight motor vehicle bodies. These are nowadays mainly used in non-load-bearing regions. Owing to the high production and material costs of fibrous composite plastic components and to the high effort and cost involved in joining them, these light-weight materials can only be used economically if the number of joining operations is reduced.

The production of a bodyshell structure, in particular a unitised frame structure for a motor vehicle body, from fibre-reinforced plastic materials therefore necessitates novel production concepts which cannot be directly derived from classic metal construction. The term bodyshell structure in particular refers to an occupant cell or a body frame structure, in any case to a 3-dimensional structure which partially encloses an interior.

BRIEF SUMMARY OF THE INVENTION

The present invention is therefore based on the problem of providing a method for the production of a cellular bodyshell structure for a motor vehicle which permits a cost-effective production of such a bodyshell structure which is simple in terms of process engineering, a particular aim being the reduction of the number of joints. The present invention is further based on the problem of providing a bodyshell structure of this type which is made of a fibre-reinforced plastic material.

The method therefore comprises at least the following steps:
a) the provision of a sheet-like textile support element made of reinforcement fibres, which is impregnated with a curable matrix material,
b) the positioning of reinforcing and moulding elements made of a fibrous material of reinforcement fibres, which is impregnated with a curable matrix material, on the support element,
c1) the shaping, in particular folding, of the support element around at least one mould core corresponding to the contour of the cellular bodyshell structure,
c2) the joining of all mutually adjoining elements by adhesive force to form a single-piece structure,
d) the curing of the matrix material,
e) the removal of the at least one mould core.

In such a method according to the invention, a sheet-like textile support element made of reinforcement fibres, which is impregnated with a curable matrix material, is first provided. This may for example be a prepreg or an SMC (sheet moulding compound). In the next step, reinforcing and moulding elements for the bodyshell structure are positioned at or in particular on the support element. The support element is then, possibly with the reinforcing and moulding elements positioned thereon, shaped around at least one mould core, whereupon the matrix material is cured in the next step. Finally, the at least one mould core is removed from the structure thus created.

Particularly important in this context is the fact that the reinforcing and moulding elements as well as the support element are joined by adhesive force at adjoining regions while being moulded around the mould core to provide a 3-dimensional cellular structure. This joining by adhesive force can be achieved very effectively, because the elements and the support structure still contain uncured matrix material and are in themselves plastically deformable. The curing of the matrix material produces strong and non-detachable joints, forming an single-piece cellular bodyshell structure.

By curing the moulded support element, which is wholly impregnated with matrix material, a single-piece bodyshell component entirely joined by adhesive force at all joints is created, into which are already integrated all or at least most of the reinforcing and moulding elements required. As a result, the method according to the invention advantageously achieves the maximum possible reduction of joining steps in the production of the bodyshell. The overall adhesive joint between support elements and reinforcing and moulding elements further minimises potential structural weaknesses in the bodyshell structure and results in particularly stable and secure structures. In addition, the positioning of reinforcing and moulding elements, in particular on the initially sheet-like support element, is a particularly simple step in terms of process engineering. The 3-dimensional arrangement of the elements of the bodyshell structure is left to the next step, i.e. the moulding of the support element around the at least one mould core. In the simplest case, this may involve a simple folding of the support element around the core, which is likewise very simple in terms of process engineering. The use of pre-impregnated textile support elements made of reinforcement fibres further simplifies the method, so that there is no need for any resin infusion or impregnation of the fibres in the curing process. As a result, the curing process requires only low pressures, so that in certain circumstances no tool may be needed for the external contour.

It is particularly advantageous to produce the reinforcing and moulding elements likewise from a fibrous material made of reinforcement fibres which are impregnated with a curable matrix material. In this case, there is no need for a process step involving the joining of these components to the support element following the positioning of these components on the support element. In the curing process, the assembly of support, reinforcing and moulding elements becomes a single-piece component, which offers great advantages in terms of process engineering while greatly increasing the stability of the bodyshell structure created in this way.

For the production of the reinforcing and moulding elements, a variety of alternative or complementary methods is available. As an alternative to solid elements made of a fibrous material, reinforcing and moulding elements can be made of a fibrous material which at least partially surrounds a support element made of foam or a material having a honeycomb structure. It is further possible to design these elements such that at least a part of a fibrous material surrounds a core which can be removed after the curing step d), so that this region becomes a hollow profile in the resulting bodyshell structure. These methods may be used in a complementary manner, so that for each region of the bodyshell structure, the embodiment of the reinforcing and moulding elements which best meets the local weight and strength requirements can be chosen. A solid moulding element made of a fibrous material provides a very high load carrying capacity owing to its high cross-sectional fibre density. The other two embodiments are aimed at saving weight, and a support element made of foam or a material having a honeycomb structure can give additional stability to the reinforcing or moulding element.

In a further development, the reinforcing and moulding elements are in addition partially made of metal, in particular aluminium or steel. This results in a composite of fibre-reinforced plastic and steel or light alloy. The steel or light alloy moulding elements are particularly useful as joining elements for fitting further metallic bodyshell components. In this case, conventional metallic joining methods such as welding can be used.

The textile support element is further preferably designed such that is has cut-outs representing door or window openings or the like. In this way, these openings can already be prepared in a method according to the invention without any need for subsequent cutting processes for the provision of such openings.

It is further particularly advantageous if the orientation of the reinforcement fibres of the textile support element and/or of the reinforcing and moulding elements is optimised in terms of power flow and tension. The results of power flow and tension analyses can therefore be applied directly to the construction of the bodyshell. The matching of the fibre orientation to the expected power flows and material tensions results in an even lighter and thinner constriction of the relevant components, because the necessary strength is provided by the optimally deposited fibres.

In order to provide additional stability at the contact points between individual moulding and reinforcing elements, the shaping of the support element in step c) can be followed by fitting at least one additional joining element in the region of such a contact point between at least two reinforcing or moulding elements. This joining element is preferably joined to the reinforcing or moulding elements by sewing or adhesive-bonding. Such joining elements can provide additional force paths which further improve the static and dynamic load carrying capacity of a bodyshell structure of this design.

To secure the pre-positioning of the reinforcing and/or moulding elements in step b), these elements can likewise be joined to the support element by sewing and/or adhesive-bonding before the latter is moulded to the mould core in step c).

Depending on the bodyshell type, the mould core may have to be surrounded completely or partially. As the support element is shaped, for example, the side of the mould core which corresponds to an upward-opening occupant cell of a motor vehicle may remain uncovered. This may for example apply to a convertible.

In a further embodiment, the mould core supports fixing or positioning aids for the reinforcing or moulding elements. These may in particular be grooves, edges or mouldings. As the mould core is surrounded in step c), the respective reinforcing or moulding elements can be latched and fixed into the preset positions with high accuracy. This results in a very high dimensional accuracy of the whole bodyshell structure.

The mould core itself may consist of one or more parts. The core is preferably assembled from several individual elements in such a way that it can be dismantled and re-used. Depending on how firmly the individual parts of the core are assembled, a single core or a plurality of cores may be used. Separable metal cores are of particular interest in this context.

It is further possible to fit clamping or fixing means for fixing the moulding elements after or during the moulding of the support element around the at least one mould core. A combination of grooves or recesses with externally provided clamping devices is particularly effective.

The fixing of the support element or the reinforcing or moulding elements respectively can be improved further by moulding the support element around the at least one mould core in a tensioned state. The reinforcing or moulding elements are in this process preferably pressed into the grooves, recesses or edges of the positioning aids in the core or on the core surface.

Further reinforcing and moulding elements can be fitted between steps c) and d). In a further embodiment of the method, the curing process in step d) of the method is preceded by fitting additional connecting elements for joining adjacent components to the support element. This simplifies the further processing of the bodyshell structure as the vehicle is assembled. These connecting elements may in particular be metallic connecting elements.

In a particularly preferred embodiment of the method, the reinforcing and/or moulding elements are positioned such in step b) that they form a space frame structure after the curing process in step d). Such space frames form the basis of unitised bodies and in particular provide optimised force paths which in turn provide for an optimum load carrying capacity of a bodyshell structure of this construction, both under normal operating conditions and in an accident.

The curing process of step d) may be thermally or photo-initiated, or it may involve a cold cure, the application of pressure or pressing.

The preferred curing methods include thermosetting, in particular under external pressure, because the viscosity of the resin decreases during or immediately before the cure, or because solid resins melt and flow into the interstices between the fibres. Thermosetting involves suitable heating, wherein the resin melts before the cure at a temperature below the curing temperature of the fibrous material, resulting in thermal crosslinking as the curing temperature is reached.

Photo-initiated curing processes, in particular involving UV light, are preferred for fibrous materials with liquid resins. A photo-chemical pre-crosslinking may be followed by a final thermal crosslinking process.

This results in reduced cycle times in the manufacturing process, so that the production costs for the fibrous composite components can be reduced significantly. In this context, it is particularly advantageous that the reinforcement fibres or fibre bundles together with the pre-stage of the matrix are available in a state of excellent mouldability which is particularly suitable for complex knitting, weaving or knotting processes.

In an advantageous further development of the method according to the invention, the curing of the fibrous composite material according to step d) includes a pressing process, the application of external pressure and/or a heating of the fibrous composite material. In this case, the pre-moulded bodyshell structure can be pressed and cured in a preferably heated tool. The use of so-called autoclaves or microwave devices is also conceivable in the curing step. In the autoclave, the bodyshell structure is preferably wrapped in a protective foil in the known manner in order to apply a planar external pressure to the fibrous material.

A resin from the group of crosslinkable thermosetting and/or elastomer materials can be used as a matrix material.

Particularly suitable resins are thermally, cold- or UV-curing polyester, polyurethane, epoxy or phenolic resins or vinyl ester. Particularly preferred polymer blends are vinyl ester/polyurethane blends.

Preferred materials for reinforcing fibres are glass fibres, carbon fibres, ceramic fibres, metal fibres, natural fibres or a blend of at least two of these fibrous materials. Further suitable reinforcing fibres are aramide fibres or high-modulus polyethylene fibres.

Preferred materials for the mould core for moulding the support element in step c) of the method are sand, wood, plastic or cardboard.

The invention further relates to a bodyshell structure for a motor vehicle which comprises a sheet-like support element and a plurality of reinforcing and moulding elements made of a fibrous composite material, wherein the bodyshell structure is produced by moulding the support element and the reinforcing and moulding elements on a mould core, followed by curing.

A bodyshell structure of this type can advantageously be produced without any further process steps using a method according to the invention as described above. The reinforcing elements are preferably arranged in the form of a space frame structure.

As has been explained in the description of the method, at least one reinforcing element may comprise a core of foam or a material having a honeycomb structure, or it may have an internal cavity. The actual structuring of such reinforcing elements is essentially determined by their application and by the compressive, flexural or torsion forces to be expected. By choosing a suitable variant, an optimum compromise can be achieved between flexural and torsional stiffness, expandability and compressibility, overall weight and space requirements for all parts of the bodyshell structure.

For a further optimisation of power flow, such a bodyshell structure can advantageously be supplemented by connecting elements placed between at least two adjacent reinforcing and/or moulding elements, whereby additional force paths are advantageously made available.

The invention finally relates to a motor vehicle with a bodyshell structure of this type. The construction of the bodyshell structure as a closed cell with a space frame structure in particular imparts on such a motor vehicle an extremely high static and dynamic load carrying capacity combined with an extremely low weight. The simple production of the bodyshell structure in one piece as described above results in a particularly cost-effective and safe manufacture of such a motor vehicle.

BRIEF DESCRIPTION OF THE SEVERAL VIEWS OF THE DRAWINGS

The invention will be explained in greater detail below with reference to the drawing, of which.

DETAILED DESCRIPTION OF THE INVENTION

Figure 1:
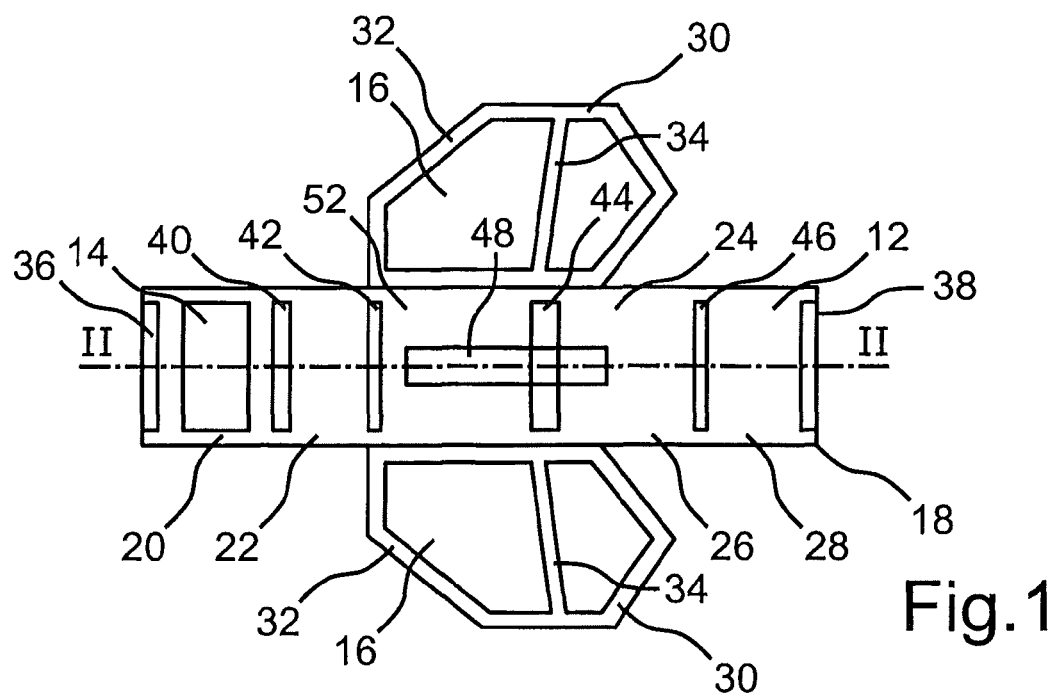
FIG. 1 is a diagrammatic representation of a support element spread in two dimensions following the positioning of reinforcing and moulding elements in process step b)

To produce a bodyshell structure according to the invention for a motor vehicle, a sheet-like support element 12 has first to be made available. As FIG. 1 shows, this is a piece of textile material spread in one plane, which is cut in such a way that its contour represents the desired finished contour of the bodyshell structure in form of a geometric grid in one plane. The support element 12 is a textile piece made of reinforcement fibres. Depending on the desired material properties, the reinforcement fibres may be glass fibres, carbon fibres, ceramic fibres, metal fibres, natural fibres, aramide fibres or high-modulus polyethylene fibres. Blends of such fibres can obviously be used as well.

The strength of the support element 12 can be optimised further in the manufacturing process by optimising the arrangement of the reinforcement fibres in the support element 12 in response to previously completed power flow and tension analyses. As a result, the local strength of the support element 12 varies with the loads to be expected, so that the fibre density is optimised in each region of the support element 12. In order to obtain a secure arrangement of the fibres, the support element 12 is preferably produced from pre-impregnated reinforcement fibres. For this purpose, the fibres are impregnated with a curable resin material which is preferably chosen from the group including thermally, cold- or UV-curing polyester, polyurethane, epoxy or phenolic resins or vinyl ester. Vinyl ester/polyurethane blends are also highly suitable for this application.

In addition to trimming the support element 12 to match an external contour, further cut-outs can already provided in the inner region of the support element 12 during its provision, for example window openings 14 or door openings 16.

In the illustrated embodiment, the support element 12 represents the contour of a complete occupant cell. It comprises a substantially rectangular base region 18 with a first region 20 which will later accommodate the windscreen, a second region 22 which will later represent a bulkhead region of the occupant cell, a third region 24 which corresponds to the eventual vehicle floor, a region 26 which corresponds to the eventual fitting region for a rear module and a region 28 which will later accommodate a rear window. Opened up in the manner of wings, two frame-like aperture panels 30 adjoin the base region 18 to form a door frame 32 and a pillar 34 of the occupant cell in the finished bodyshell structure.

In a further preferred embodiment of the invention, the aperture panels are already integrated in the moulding process of the bodyshell structure, i.e. before the curing of the matrix material. For this purpose, the mould core can be provided with the aperture panel before the bodyshell structure is moulded. The mould core can laterally support at least one side frame of the cellular bodyshell structure. This comprises at least one frame-type aperture panel 30, a door frame 32 and at least one pillar 34. As the side frame is joined to the elements in step c2) and integrated into the single-piece structure, there is no need for an additional complex joining operation.

After the structure has been made and subsequently been impregnated with matrix material if applicable, further reinforcing and moulding elements are positioned on the support structure 12 in the second process step. In the illustrated embodiment, these comprise a front roof crossmember 36, a rear roof crossmember 38, a first 40 and second 42 crossmember in the bulkhead region, a crossmember 44 and a crossmember 46 at the level of the kerb. In addition, a tunnel structure 48 extending in the longitudinal direction of the vehicle is provided.

Figure 2:
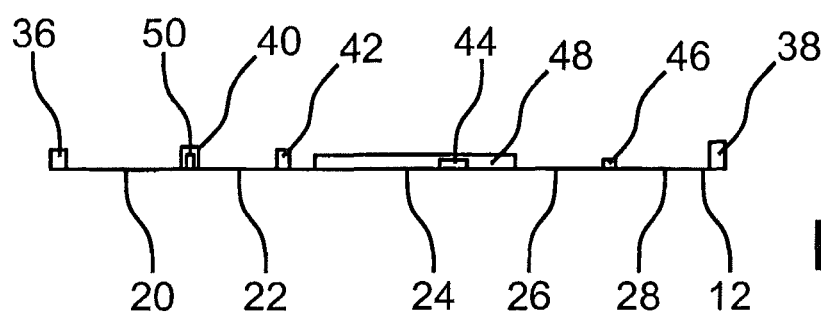
FIG. 2 is a longitudinal section through the structure shown in FIG. 1 along line II-II.

FIG. 2 shows the arrangement of these reinforcing elements in a longitudinal section along line II-II. The complete volume of the reinforcing elements can be represented by woven or knitted fabrics made of reinforcement fibres and impregnated with a curable matrix material. For an optimum compromise between load carrying capacity and weight, a moulded body 50 which is then surrounded by a textile material of reinforcement fibres can be installed as shown in cross-section at the bulkhead crossmember 40. The moulded body 50 may be a mould core which can be removed later to produce a hollow profile. On the other hand, a core may be chosen which will remain in the reinforcing element to influence its material properties in the desired manner.

For this purpose, foam or honeycomb materials can be used, which have a very high load carrying capacity combined with a very low weight.

Depending on the matrix materials used for impregnating both the support element 12 and all of the reinforcing elements, the reinforcing elements can be positioned by simple placement and pressing-on. To achieve a particularly high positional security, these elements may alternatively be joined to the support structure 12 by sewing and/or adhesive bonding, particularly if they are made from textile base materials.

Figure 3:
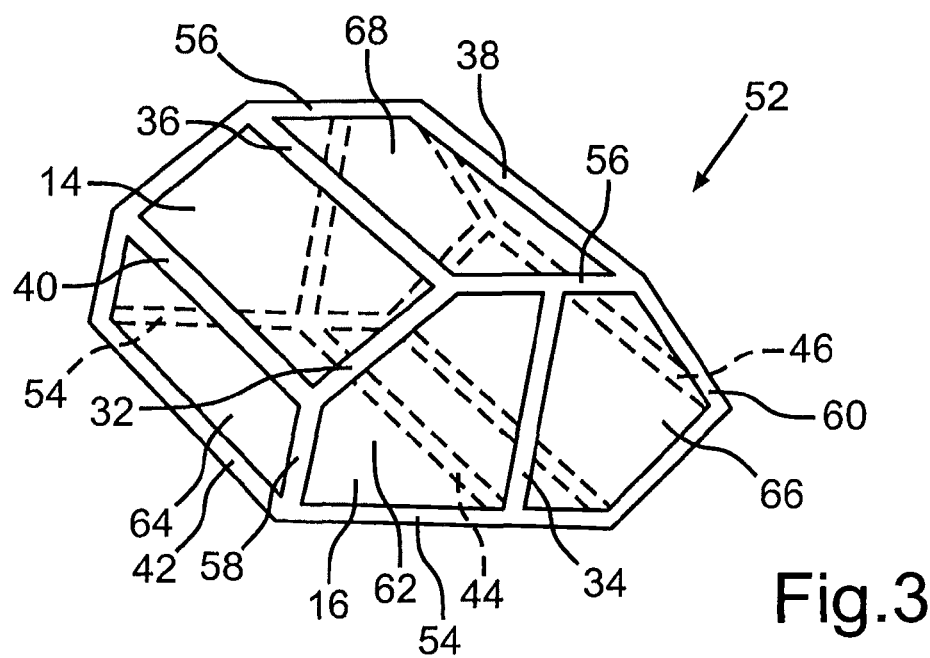
FIG. 3 is a three-dimensional diagrammatic view of a bodyshell structure according to the invention.

In the next process step, a mould core is placed in the central region 52 of the support element 12; this represents the interior of the bodyshell structure. The support element 12 with the reinforcing and moulding elements attached thereto and pre-positioned thereon can now be moulded around this mould core, in particular simply folded, resulting in the final three-dimensional structure shown in FIG. 3. This then has to be cured, which, depending on the matrix materials used, can be achieved by cold curing, UV-initiation, the application of pressure or a combination of these methods.

The structure now represents a complete cellular bodyshell 52, the crossmember elements of the cell being represented by the reinforcing elements 36, 38, 40, 42, 44 and 46. The support element 12 forms the side members 54 in the floor region, the roof side members 56, the pillars 34, 58, 60 and a vehicle floor 62, a bulkhead 64 and a rear wall 66 of the occupant cell. The roof region is left open in the illustrated embodiment and is available for the installation of a roof module.

The essential aspect in this context is the fact that the cellular bodyshell structure is made of a composite of a sheet-like support element (12) and a plurality of reinforcing and moulding elements (36, 38, 40, 42, 44, 46, 48) of a fibrous composite material, which are joined together by adhesive force. In the bodyshell structure, the individual elements can only be assigned formally, as they have become an integral and non-detachable part of the bodyshell structure.

The elements which are here represented by the support structure 12 only can obviously be reinforced further by further reinforcing elements positioned in process step b). Connecting elements to be placed between the reinforcing elements may be provided in addition. It is further possible to join additional joining parts which simplify the further assembly of the motor vehicle, such as parts for joining doors, external cladding or functional elements of the vehicle, to the support element 12 or to one of the reinforcing elements in the process of producing the cellular bodyshell.

The cellular bodyshell structure preferably supports at least one and preferably both side frames. This side frame can then likewise be considered to be integral with the bodyshell structure.

The invention claimed is:

1. A method for the production of a cellular bodyshell structure (52) for a motor vehicle, comprising the following steps:
    a) providing a sheet-like textile support element (12) made of reinforcement fibers, which is impregnated with a curable matrix material,
    b) positioning reinforcing and molding elements (36, 38, 40, 42, 44, 46, 48) made of a fibrous material of reinforcement fibers, which is impregnated with a curable matrix material, on the support element (12),
    c1) shaping the support element (12) around at least one mold core corresponding to the contour of the cellular bodyshell structure,
    c2) joining all mutually adjoining elements by adhesive force to form a single-piece structure,
    d) curing of the matrix material,
    e) removing the at least one mold core.

2. The method according to claim 1, wherein the mold core laterally supports at least one side frame of the cellular bodyshell structure, which comprises a frame-like aperture panel (30), a door frame (32) and at least one pillar (34).

3. The method according to claim 2, wherein the side frame is joined to the elements and integrated into the single-piece structure in step c2).

4. The method according to claim 2, wherein reinforcing and molding elements (36, 38, 40, 42, 44, 46, 48) are used, the fibrous material of which at least partially surrounds a supporting element (50) made of foam or of a material with a honeycomb structure.

5. The method according to claim 1, wherein reinforcing and molding elements (36, 38, 40, 42, 44, 46, 48) are used, the fibrous material of which at least partially surrounds a core which can be removed after curing in step d).

6. The method according to claim 1, wherein at least one of the reinforcing and molding elements (36, 38, 40, 42, 44, 46, 48) or the side frame is partially made of at least one of aluminium and steel.

7. The method according to claim 1, wherein at least one side of the mold core is left free in the molding process of the support element (12).

8. The method according to claim 1, wherein the mold core is provided with guidance means selected from grooves, edges and moldings, for attaching the reinforcing or molding elements.

9. The method according to claim 1, wherein at least one of clamping and fixing means for fixing the molding elements are fitted after or during the molding of the support element (12) around the at least one mold core.

10. The method according to claim 1, wherein for an additional fixing of the molding elements, the support element (12) is moulded around the at least one mold core under tension.

11. The method according to claim 1, wherein further reinforcing and molding elements (36, 38, 40, 42, 44, 46, 48) are fitted between steps c1) and d).

12. The method according to claim 1, wherein a support element (12) with cut-outs for at least one of door (16) and window openings (14) is used.

13. The method according to claim 1, wherein the reinforcement fibers of at least one of the textile support element (12) and the reinforcing and molding elements (36, 38, 40, 42, 44, 46, 48) are oriented optimally in terms of power flow and tension.

14. The method according to claim 1, wherein following the molding of the support element (12) in step c1), connecting elements are joined by at least one of sewing and adhesive bonding to the at least two reinforcing and molding elements (36, 38, 40, 42, 44, 46, 48) at at least one contact point between least two reinforcing or molding elements (36, 38, 40, 42, 44, 46, 48).

15. The method according to claim 1, wherein the reinforcing and molding elements (36, 38, 40, 42, 44, 46, 48) positioned on the support element (12) in step b) are joined to the support element (12) by at least one of sewing and adhesive bonding.

16. The method according to claim 1, wherein connecting elements for joining adjacent components are fitted to the support element (12) before the curing process in step d).

17. The method according to claim 1, wherein the reinforcing and molding elements (36, 38, 40, 42, 44, 46, 48) form a space frame structure after the curing process in step d).

18. The method according to claim 1, wherein the curing process in step d) is based on at least one of thermal-initiation, photo-initiation, a cold cure, and the application of pressure and pressing.

19. The method according to claim 1, wherein the matrix material is chosen from the group including thermally, cold- or UV-curing polyester, polyurethane, epoxy and phenolic resins and vinyl ester.

20. The method according to claim 1, wherein at least one of glass fibers, carbon fibers, aramide fibers, polyethylene fibers, ceramic fibers, metal fibers and natural fibers is chosen as reinforcement fibers.

21. The method according to claim 1, wherein at least one mold core made of at least one of metal, sand, wood, plastic and cardboard is used.

22. A cellular bodyshell structure (52) for a motor vehicle, wherein the bodyshell structure is a single-piece component represented by a composite of a sheet-like support element (12) and a plurality of reinforcing and molding elements (36, 38, 40, 42, 44, 46, 48) made of a fibrous composite material and joined by adhesive force.

23. The bodyshell structure according to claim 22, wherein the reinforcing elements (36, 38, 40, 42, 44, 46, 48) are arranged in the form of a space frame structure, and wherein the single-piece bodyshell structure comprises at least one side frame with a frame-like aperture panel (30), a door frame (32) and at least one pillar (34).

24. The bodyshell structure according to claim 22, wherein at least one of the reinforcing elements (36, 38, 40, 42, 44, 46, 48) has a core (50) made of a material selected from the group consisting of a foam and a material having a honeycomb structure.

25. The bodyshell structure according to claim 22, wherein at least one of the reinforcing elements (36, 38, 40, 42, 44, 46, 48) has an internal cavity.

26. The bodyshell structure according to claim 22, wherein a connecting element is provided between at least two adjacent elements selected from the group consisting of reinforcing elements and molding elements (36, 38, 40, 42, 44, 46, 48).

27. A motor vehicle having a bodyshell structure wherein the bodyshell structure is a single-piece component represented by a composite of a sheet-like support element (12) and a plurality of reinforcing and molding elements (36, 38, 40, 42, 44, 46, 48) made of a fibrous composite material and joined by adhesive force.

* * * * *